May 28, 1929.  L. T. WEISS, JR  1,714,535
RETAINER FOR REMOVABLE ROTARY BODIES
Filed April 28, 1928
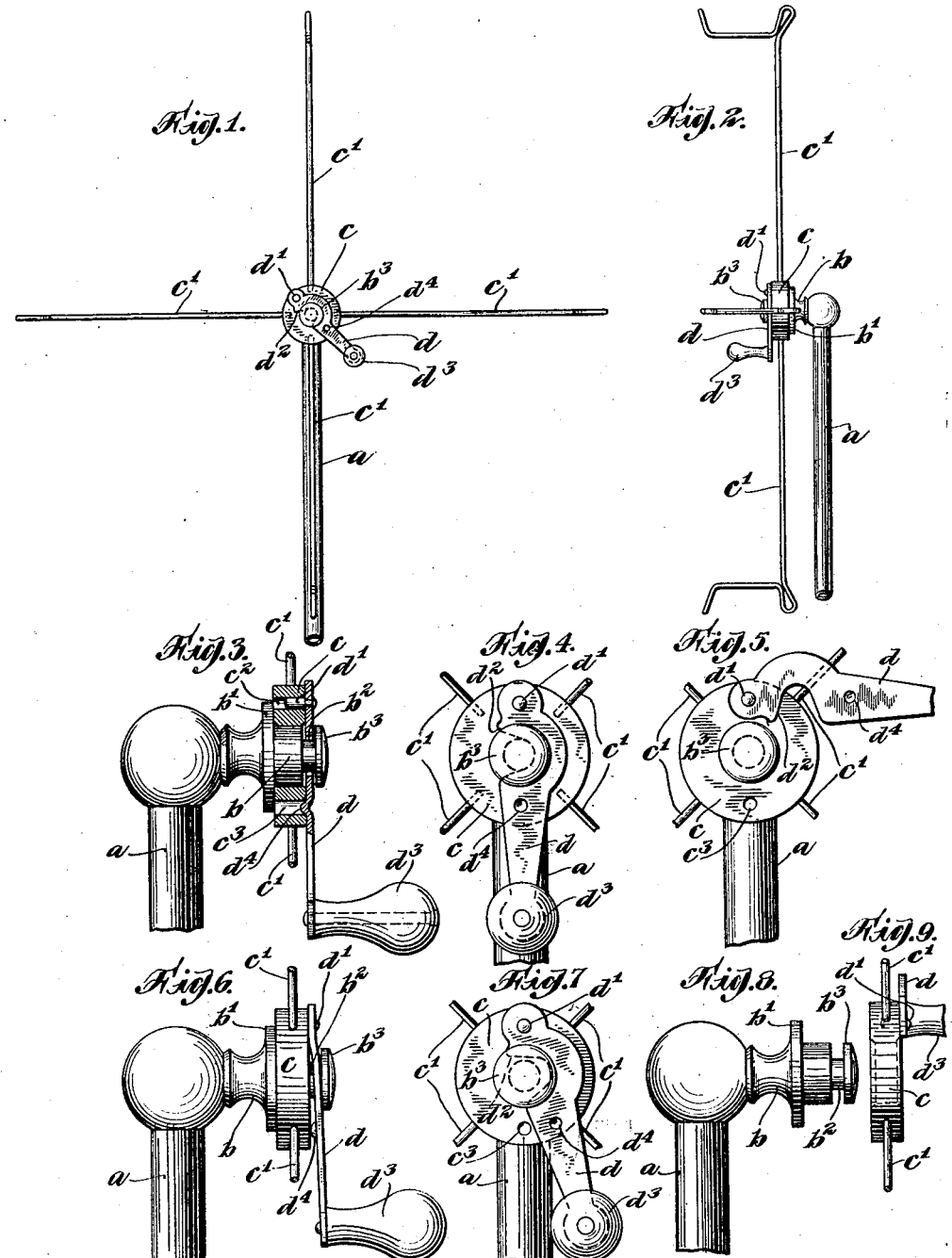
INVENTOR
Louis T. Weiss Jr
BY
Redding, Greeley, O'Shea & Campbell
ATTORNEYS Patented May 28, 1929.

1,714,535

UNITED STATES PATENT OFFICE.

LOUIS T. WEISS, JR., OF BROOKLYN, NEW YORK.

RETAINER FOR REMOVABLE ROTARY BODIES.

Application filed April 28, 1928. Serial No. 273,507.

This invention has been developed with particular reference to its use in connection with reels for the drying of fishing lines, such as that shown, for example, in Letters Patent of the United States, 1,310,816, dated July 22, 1919, but is capable of application wherever a body capable of rotation is mounted removably on a stud or spindle, on which it must be retained in operation and must be readily removable therefrom. For convenience in description reference is made hereinafter to a reel as the body to be rotated, but it will be understood that such term is used for convenience only and as a name for any analogous rotary body. The device with which the invention is particularly concerned, in its relation to the rotary body and the supporting stud, serves not only as a means for retaining the rotary body on its support but as a convenient means for effecting the rotation of that body and also as a convenient means for applying a brake or drag to such body, so that tension may be placed on the line as it is drawn off from the reel, if the invention be applied, for example, in connection with a reel. The invention will be explained more fully hereinafter with reference to the accompanying drawing in which it is illustrated and in which:

Figure 1 is a view in elevation of a reel and support in connection with which the invention is applied.

Figure 2 is a view of the same in elevation as seen from the left-hand in Figure 1.

Figure 3 is a detail view on a larger scale, partly in elevation and partly in section, showing the device in use as a retainer and crank.

Figure 4 is a view of the same in elevation as seen from the right-hand in Figure 3.

Figure 5 is a view similar to Figure 4 but showing the retainer in release position and partly broken away to save space.

Figure 6 is a view similar to Figure 3 but wholly in elevation and showing the device in use as a retainer and drag.

Figure 7 is a view of the same as seen from the right-hand in Figure 6.

Figure 8 is a view in elevation showing the support and stud on which the reel or rotary body is to be mounted.

Figure 9 is an edge view of the hub of the reel or rotary body with the retainer in released position.

In the embodiment of the invention illustrated in the drawing a standard $a$ is shown as supporting at its upper end a stud $b$ which is represented as having a stop flange $b^1$ and, near its outer end, a circumferential groove $b^2$ and head $b^3$. The rotary body, in the construction illustrated, is the hub $c$ of a reel, the arms $c^1$ of which are formed to receive a fishing line to be dried or any other line which is to be wound upon the reel or drawn off from the same. Pivoted eccentrically upon the hub $c$, as by means of a pin $d^1$ engaged in a hole $c^2$ of the hub $c$, is a retainer $d$ which may be notched on one side, as at $d^2$, and is adapted to engage the groove $b^2$ of the rotary body $c$, thus preventing the rotary body from accidental displacement from the stud $b$. The retainer is shown as having a handle $d^3$ forming a crank by which the reel can be rotated when desired. For the purpose of securing driving engagement between the retainer and the rotary body and for the purpose also of preventing accidental displacement of the retainer, the latter is provided on its inner side with a rounded projection $d^4$, which may be formed by indenting the retainer, as shown in Figure 3, such projection being adapted to enter the hole or recess $c^3$ formed in the rotary body $c$. When the projection $d^4$ is in engagement with the hole or recess $c^3$, as shown in Figures 3 and 4, the rotary body is free to be rotated on the stud $b$, the retainer entering the groove $b^2$ freely. Means is provided, however, for effecting frictional engagement between the retainer and the stud for the purpose of putting a drag or brake on the rotary body or reel and for this purpose the retainer is displaced slightly from the position shown in Figures 3 and 4 so that the projection $d^4$ shall rest against the rotary body and the retainer be thereby caused to bear against the head $b^3$ of the stud $b$, as shown in Figures 6 and 7, thereby exerting a braking action to prevent overrunning of the reel when the line is being drawn off therefrom.

When it is desired to remove the rotary body from the reel or other rotary body from its supporting stud the retainer is turned upon its pivot to the position indicated in Figures 5 and 9, thereby disengaging the rotary body from the stud and permitting it to be withdrawn bodily.

I claim as my invention:

1. The combination of a rotary body, a stud on which the rotary body is mounted, the stud having a groove at its outer end, a retainer eccentrically pivoted on the rotary body and adapted to engage the stud to prevent accidental displacement of the rotary body, and means to effect frictional engagement of the retainer and the stud.

2. The combination of a rotary body, a stud on which the rotary body is mounted, the stud having a groove at its outer end, and a retainer eccentrically pivoted on the rotary body and adapted to engage the stud to prevent accidental displacement of the rotary body, the retainer having on its inner side a projection to bear against the rotary body and cause frictional engagement between the retainer and the stud.

This specification signed this 23d day of April A. D. 1928.

LOUIS T. WEISS, Jr.